(12) United States Patent
Namikawa et al.

(10) Patent No.: US 11,400,970 B2
(45) Date of Patent: Aug. 2, 2022

(54) STEERING SYSTEM

(71) Applicants: JTEKT CORPORATION, Osaka (JP); TOYOTA JIDOSHA KABUSHIKI KAISHA, Toyota (JP)

(72) Inventors: Isao Namikawa, Okazaki (JP); Koji Anraku, Okazaki (JP); Yusuke Kakimoto, Okazaki (JP); Yoshio Kudo, Machida (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 158 days.

(21) Appl. No.: 16/794,343

(22) Filed: Feb. 19, 2020

(65) Prior Publication Data

US 2020/0269907 A1 Aug. 27, 2020

(30) Foreign Application Priority Data

Feb. 27, 2019 (JP) .............................. JP2019-034177

(51) Int. Cl.
*B62D 5/04* (2006.01)
*B62D 6/04* (2006.01)
*B62D 15/02* (2006.01)

(52) U.S. Cl.
CPC ......... *B62D 5/0463* (2013.01); *B62D 5/0409* (2013.01); *B62D 6/04* (2013.01); *B62D 15/025* (2013.01)

(58) Field of Classification Search
None
See application file for complete search history.

(56) References Cited

U.S. PATENT DOCUMENTS

| 4,878,004 | A | 10/1989 | Shimizu |
| 4,956,590 | A | 9/1990 | Phillips |
| 6,268,708 | B1 | 7/2001 | Kawada et al. |
| 2006/0080016 | A1 | 4/2006 | Kasahara et al. |
| 2008/0156572 | A1* | 7/2008 | Kasahara .............. F16D 41/088 |
| | | | 180/402 |

(Continued)

FOREIGN PATENT DOCUMENTS

| EP | 0361725 A1 | 4/1990 |
| EP | 1035001 A2 | 9/2000 |

(Continued)

*Primary Examiner* — Jeff A Burke
*Assistant Examiner* — Jerrod Irvin Davis
(74) *Attorney, Agent, or Firm* — Oliff PLC

(57) ABSTRACT

A steering system includes a mechanism configured to turn a steer wheel of a vehicle, a motor configured to generate driving force that is applied to the mechanism, and a controller configured to control the motor according to a steering status. The controller includes a limiting control circuit configured to limit a current that is supplied to the motor to a limiting value, a determining circuit configured to determine whether the steer wheel is in contact with an obstacle by using at least a comparison between a value of the current that is supplied to the motor and a threshold, and a threshold computing circuit configured to compute the threshold that is used by the determining circuit, the threshold computing circuit being configured to compute a value less than the limiting value according to the limiting value as the threshold.

5 Claims, 6 Drawing Sheets

(56) References Cited

U.S. PATENT DOCUMENTS

| | | | | |
|---|---|---|---|---|
| 2014/0343791 A1* | 11/2014 | Suzuki | ................ | B62D 5/0487 |
| | | | | 701/41 |
| 2015/0009730 A1 | 1/2015 | Pasqualetto | | |
| 2015/0134205 A1* | 5/2015 | Shibuya | ............... | B62D 5/0484 |
| | | | | 701/42 |
| 2015/0353126 A1* | 12/2015 | Chai | .................... | B62D 5/0463 |
| | | | | 701/42 |
| 2018/0208235 A1* | 7/2018 | Miyashita | .............. | B62D 5/003 |
| 2019/0367084 A1* | 12/2019 | Hong | ................... | B62D 5/0469 |

FOREIGN PATENT DOCUMENTS

| | | | |
|---|---|---|---|
| JP | 2006-111099 A | | 4/2006 |
| JP | 2019-127217 A | | 8/2019 |
| JP | 2019-209944 A | | 12/2019 |
| WO | 2007/093875 A2 | | 8/2007 |
| WO | WO-2016194885 A1 | * | 12/2016 |

* cited by examiner

STEERING SYSTEM

CROSS-REFERENCE TO RELATED APPLICATION

This application claims priority to Japanese Patent Application No. 2019-034177 filed on Feb. 27, 2019, incorporated herein by reference in its entirety.

BACKGROUND

1. Technical Field

The disclosure relates to a steering system.

2. Description of Related Art

There is a so-called steer-by-wire steering system in which power transmission between a steering wheel and steer wheels is separated. The steering system includes a reaction motor and a steering motor. The reaction motor is a source of a steering reaction force that is applied to a steering shaft. The steering motor is a source of a wheel steering force that turns the steer wheels. When a vehicle is travelling, a controller of the steering system generates a steering reaction force by controlling electric power supplied to the reaction motor and turns the steer wheels by controlling electric power supplied to the steering motor.

In the steering system, it may be difficult to further turn the steer wheels, for example, when any one of the steer wheels hits a curb during stationary steering. At this time, the controller for the steering system attempts to cause the wheel steering angle of the steer wheels to follow the steering angle of the steering wheel. For this reason, the steering motor or its driver circuit may overheat as a result of supply of excessive current to the steering motor.

For example, a controller of Japanese Unexamined Patent Application Publication No. 2006-111099 (JP 2006-111099 A) determines that any one of steer wheels is in contact with an obstacle when a predetermined determination condition is satisfied. The determination condition includes, for example, a condition that the state where the actual value of current that is supplied to a steering motor is greater than or equal to a current threshold continues for a predetermined period of time. When the controller determines that the any one of the steer wheels is in contact with an obstacle, the controller executes predetermined control in order to prevent overheating of the steering motor.

SUMMARY

With the controller of JP 2006-111099 A, overheating of the steering motor can surely be prevented; however, there are the following concerns. Some controllers not only have an overheat prevention function of preventing overheating of a steering motor due to the contact of a steer wheel with an obstacle but also have an overheat prevention function based on, for example, the temperature of the steering motor. Such a controller monitors the temperature of the steering motor and, when the temperature is close to an overheating state, limits the amount of current that is supplied to the steering motor.

For this reason, for example, when any one of the steer wheels contacts an obstacle during stationary steering at the time of a start of a vehicle, the amount of current that is supplied to the steering motor may be limited based on the fact that the temperature of the steering motor is close to an overheating state before the current value of the steering motor reaches a current threshold. In this case, there are concerns that the contact of any one of the steer wheels with an obstacle is not appropriately detected because the current value of the steering motor does not reach the current threshold.

The disclosure is able to appropriately detect the contact of a steer wheel with an obstacle.

An aspect of the disclosure provides a steering system. The steering system includes a mechanism configured to turn a steer wheel of a vehicle, a motor configured to generate driving force that is applied to the mechanism, and a controller configured to control the motor according to a steering status. The controller includes a limiting control circuit, a determining circuit, and a threshold computing circuit. The limiting control circuit is configured to limit a current that is supplied to the motor to a limiting value. The determining circuit is configured to determine whether the steer wheel is in contact with an obstacle by using at least a comparison between a value of the current that is supplied to the motor and a threshold. The threshold computing circuit is configured to compute the threshold that is used by the determining circuit. The threshold computing circuit is configured to compute a value less than the limiting value according to the limiting value as the threshold.

With the above configuration, even when a current that is supplied to the motor is limited, it is possible to determine whether the steer wheel is in contact with an obstacle. This is because a current threshold that is a criterion for determination as to whether the steer wheel is in contact with an obstacle is set to a value less than the limiting value of current in protecting the motor from overheating.

In the steering system, the threshold computing circuit may be configured to compute the threshold such that the threshold does not fall within a practical current range that is a range of the value of the current that is supplied to the motor in a normal usage state of the vehicle.

With the above configuration, in a normal traveling state of the vehicle, erroneous determination that the steer wheel is in contact with an obstacle is reduced.

In the steering system, the mechanism may include a steering shaft configured to rotate in conjunction with an operation of a steering wheel and a wheel steering shaft provided such that power transmission between the steering wheel and the wheel steering shaft is separated. The motor may include a reaction motor configured to generate a steering reaction force based on a first command value that is computed according to the steering status and a steering motor configured to generate a wheel steering force based on a second command value that is computed according to the steering status. The steering reaction force may be a torque in a direction opposite from a direction of steering of the steering shaft. The wheel steering force may be a torque for turning the steer wheel and may be applied to the wheel steering shaft.

In the steering system, the controller may include a limiting axial force computing circuit configured to compute a limiting axial force as control for, when the determining circuit determines that the steer wheel is in contact with the obstacle, informing a driver that the steer wheel is in contact with the obstacle. The limiting axial force may be an axial force of the wheel steering shaft to be incorporated into the first command value for the reaction motor to virtually limit an operation of the steering wheel.

With the above configuration, when the steer wheel is in contact with an obstacle, a limiting axial force for virtually limiting an operation of the steering wheel is incorporated into the first command value for the reaction motor. Thus, a driver experiences a resistance feel as a steering reaction force. Through the resistance via the steering wheel, the driver can recognize that the steer wheel is in contact with an obstacle. An operation of the steering wheel by the driver can also be virtually limited.

In the steering system, the controller may include an ideal axial force computing circuit, an estimated axial force computing circuit, and an allocation computing circuit. The ideal axial force computing circuit may be configured to compute an ideal axial force that is an ideal axial force of the wheel steering shaft based on a target rotational angle of a rotor that rotates in conjunction with a turning motion of the steer wheel. The estimated axial force computing circuit may be configured to compute an axial force of the wheel steering shaft as an estimated axial force based on a current value of the steering motor. The current value may reflect a vehicle behavior, a road surface condition, or the steering status. The allocation computing circuit may be configured to compute a combined axial force as the axial force of the wheel steering shaft to be incorporated into the first command value for the reaction motor by combining the estimated axial force and the ideal axial force according to the vehicle behavior, the road surface condition, or the steering status. The allocation computing circuit may be configured to, when the determining circuit determines that the steer wheel is in contact with the obstacle, switch the axial force of the wheel steering shaft to be incorporated into the first command value for the reaction motor from the combined axial force to the estimated axial force as control for informing a driver that the steer wheel is in contact with the obstacle.

With the above configuration, when the steer wheel is not in contact with an obstacle, a combined axial force that is obtained by combining an ideal axial force based on a target rotational angle of the rotor and an estimated axial force based on a current value of the steering motor according to a vehicle behavior, or the like, is incorporated into the first command value for the reaction motor. Therefore, the reaction motor generates a driving force commensurate with a combined axial force. In contrast to this, when the steer wheel is in contact with an obstacle, a pure estimated axial force is incorporated into the first command value for the reaction motor. Because a vehicle behavior, a road surface condition, or a steering status is incorporated in the estimated axial force, the motor generates a driving force commensurate with an axial force that acts on the wheel steering shaft as a result of the contact of the steer wheel with an obstacle. Therefore, a driver can recognize that the steer wheel is in contact with an obstacle by experiencing a resistance feel as a steering reaction force via the steering wheel.

With the steering system according to the aspects of the disclosure, it is possible to appropriately detect that a steer wheel is in contact with an obstacle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a first embodiment in which a steering control apparatus is applied to a steer-by-wire steering system will be described.

Figure 1:
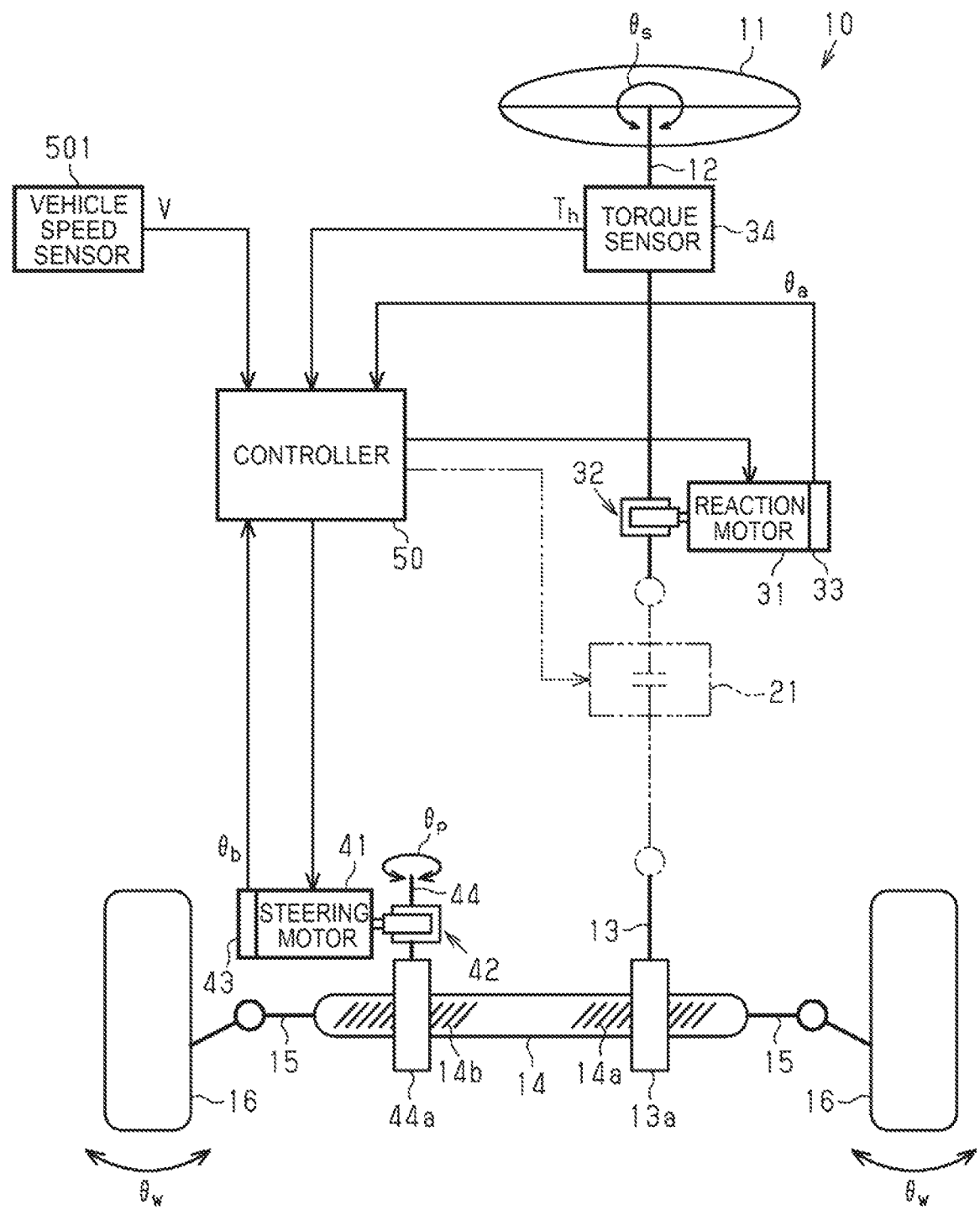
FIG. 1 is a configuration diagram of a steer-by-wire steering system in which a first embodiment of a steering control apparatus is installed.

As shown in FIG. 1, the steering system 10 for a vehicle includes a steering shaft 12 coupled to a steering wheel 11. The steering system 10 includes a wheel steering shaft 14 that extends along a vehicle width direction (right and left direction in FIG. 1). Right and left steer wheels 16 are respectively coupled to both ends of the wheel steering shaft 14 via tie rods 15. As a result of the linear motion of the wheel steering shaft 14, a wheel steering angle $\theta_w$ of the steer wheels 16 is changed. The steering shaft 12 and the wheel steering shaft 14 make up a steering mechanism.

The steering system 10 includes a reaction motor 31, a speed reduction mechanism 32, a rotational angle sensor 33, and a torque sensor 34 as components for generating a steering reaction force. A steering reaction force means a force (torque) that acts in a direction opposite from a direction in which a driver operates the steering wheel 11. By applying a steering reaction force to the steering wheel 11, an adequate resistance feel can be provided to the driver.

The reaction motor 31 is a source of a steering reaction force. For example, a three-phase (U, V, W) brushless motor is employed as the reaction motor 31. The reaction motor 31 (accurately, its rotary shaft) is coupled to the steering shaft 12 via the speed reduction mechanism 32. The torque of the reaction motor 31 is applied to the steering shaft 12 as a steering reaction force.

The rotational angle sensor 33 is provided in the reaction motor 31. The rotational angle sensor 33 detects a rotational angle $\theta_a$ of the reaction motor 31. The rotational angle $\theta_a$ of the reaction motor is used to compute a steering angle $\theta_s$. The reaction motor 31 and the steering shaft 12 are in conjunction with each other via the speed reduction mechanism 32. Therefore, there is a correlation between the rotational angle $\theta_a$ of the reaction motor 31 and the rotational angle of the steering shaft 12, by extension, a steering angle $\theta_s$ that is the rotational angle of the steering wheel 11. Therefore, a steering angle $\theta_s$ can be obtained based on the rotational angle $\theta_a$ of the reaction motor 31.

The torque sensor 34 detects a steering torque $T_b$ that acts on the steering shaft 12 through a rotating operation of the steering wheel 11. The torque sensor 34 is provided at a portion closer to the steering wheel 11 than the speed reduction mechanism 32 in the steering shaft 12.

The steering system 10 includes a steering motor 41, a speed reduction mechanism 42, and a rotational angle sensor 43 as components for generating a wheel steering force that is power for turning the steer wheels 16.

The steering motor 41 is a source of a wheel steering force. For example, a three-phase brushless motor is employed as the steering motor 41. The steering motor 41 (accurately, its rotary shaft) is coupled to a pinion shaft 44 via the speed reduction mechanism 42. Pinion teeth 44a of the pinion shaft 44 are meshed with rack teeth 14b of the wheel steering shaft 14. The torque of the steering motor 41 is applied to the wheel steering shaft 14 via the pinion shaft 44 as a wheel steering force. With the rotation of the steering motor 41, the wheel steering shaft 14 moves along the vehicle width direction (right and left direction in the drawing).

The rotational angle sensor 43 is provided in the steering motor 41. The rotational angle sensor 43 detects a rotational angle $\theta_b$ of the steering motor 41. The steering system 10 includes a pinion shaft 13. The pinion shaft 13 is provided so as to intersect with the wheel steering shaft 14. Pinion teeth 13a of the pinion shaft 13 are meshed with rack teeth 14a of the wheel steering shaft 14. The reason why the pinion shaft 13 is provided is to support the wheel steering shaft 14 together with the pinion shaft 44 inside a housing (not shown). In other words, with a support mechanism (not shown) provided in the steering system 10, the wheel steering shaft 14 is supported so as to be movable along its axial direction and is pressed against the pinion shafts 13, 44. Thus, the wheel steering shaft 14 is supported inside the housing. Alternatively, another support mechanism that supports the wheel steering shaft 14 on the housing may be provided instead of using the pinion shaft 13.

The steering system 10 includes a controller 50. The controller 50 controls the reaction motor 31 and the steering motor 41 based on results detected by various sensors. The sensors include a vehicle speed sensor 501 in addition to the rotational angle sensor 33, the torque sensor 34, and the rotational angle sensor 43. The vehicle speed sensor 501 is provided in the vehicle and detects a vehicle speed V that is the speed of travel of the vehicle.

The controller 50 executes reaction control for generating a steering reaction force commensurate with a steering torque $T_h$ through drive control over the reaction motor 31. The controller 50 computes a target steering reaction force based on the steering torque $T_h$ and the vehicle speed V, and computes a target steering angle of the steering wheel 11 based on the computed target steering reaction force, the steering torque $T_h$, and the vehicle speed V. The controller 50 computes a steering angle correction amount through feedback control over the steering angle $\theta_s$, which is executed to cause an actual steering angle $\theta_s$ to follow the target steering angle, and computes a steering reaction force command value by adding the computed steering angle correction amount to the target steering reaction force. The controller 50 supplies the reaction motor 31 with current that is required to generate a steering reaction force commensurate with the steering reaction force command value.

The controller 50 executes wheel steering control for turning the steer wheels 16 according to a steering status through drive control over the steering motor 41. The controller 50 computes a pinion angle $\theta_p$ that is an actual rotational angle of the pinion shaft 44 based on a rotational angle $\theta_b$ of the steering motor 41. The rotational angle $\theta_b$ of the steering motor 41 is detected through the rotational angle sensor 43. The pinion angle $\theta_p$ is a value that reflects the wheel steering angle $\theta_w$ of the steer wheels 16. The controller 50 computes a target pinion angle by using the above-described target steering angle. The controller 50 finds a deviation between the target pinion angle and an actual pinion angle $\theta_p$, and controls electric power that is supplied to the steering motor 41 such that the deviation is eliminated.

Figure 2:
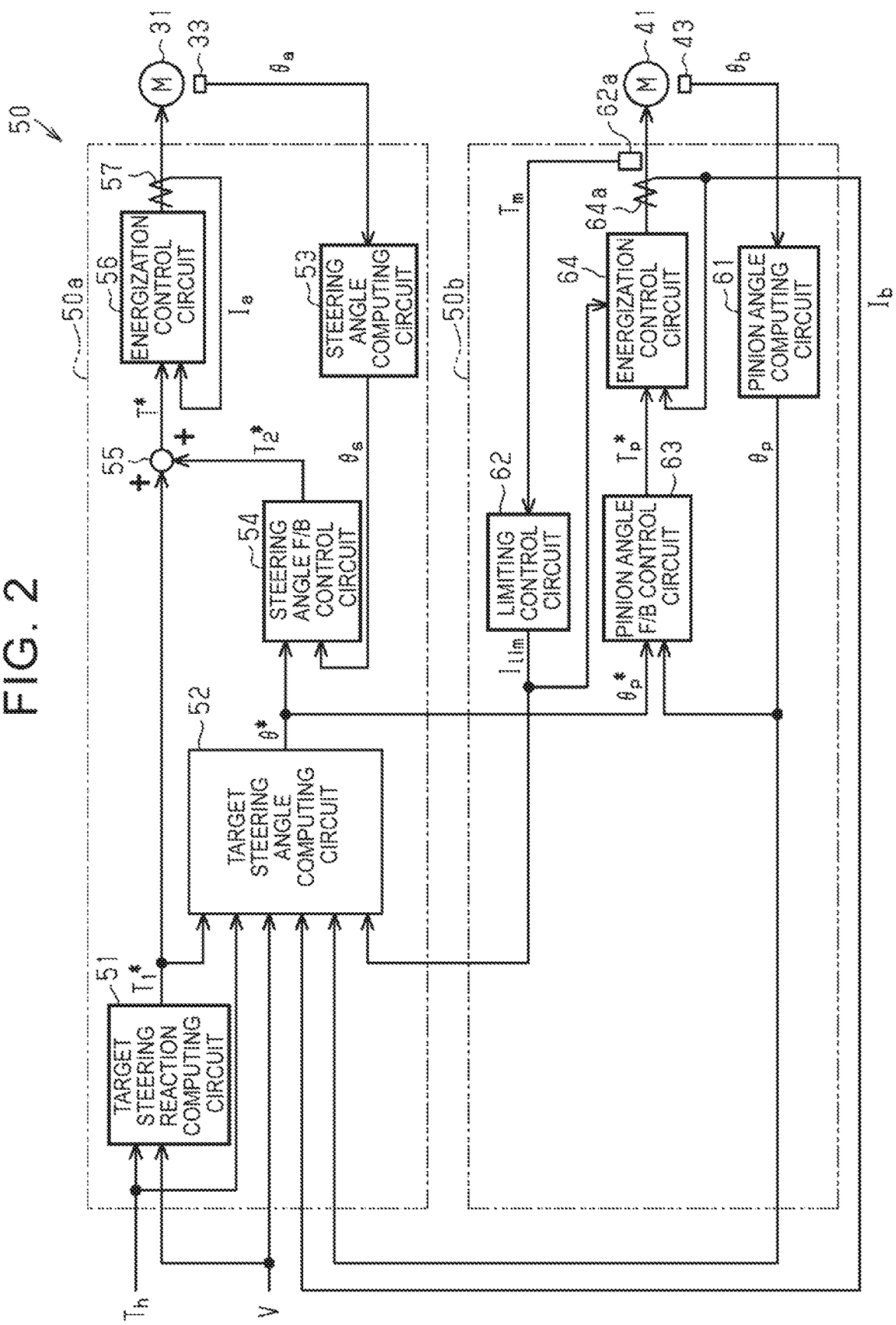
FIG. 2 is a control block diagram of a controller in the first embodiment.

Next, the controller 50 will be described in detail. As shown in FIG. 2, the controller 50 includes a reaction control circuit 50a that executes reaction control and a wheel steering control circuit 50b that executes wheel steering control.

The reaction control circuit 50a includes a target steering reaction computing circuit 51, a target steering angle computing circuit 52, a steering angle computing circuit 53, a steering angle feedback control circuit 54, an adder 55, and an energization control circuit 56.

The target steering reaction computing circuit 51 computes a target steering reaction force $T_1^*$ based on the steering torque $T_h$ and the vehicle speed V. The target steering reaction computing circuit 51 computes a target steering reaction force $T_1^*$ having a greater value (absolute value) as the absolute value of the steering torque $T_h$ increases or as the vehicle speed V decreases.

The target steering angle computing circuit 52 computes a target steering angle $\theta^*$ of the steering wheel 11 by using the target steering reaction force $T_1^*$, the steering torque $T_h$, and the vehicle speed V. When the sum of the target steering reaction force $T_1^*$ and the steering torque $T_h$ is an input torque, the target steering angle computing circuit 52 has an ideal model for setting an ideal steering angle based on the input torque. This ideal model is the one in which a steering angle corresponding to an ideal wheel steering angle commensurate with an input torque is modelized by an experiment, or the like, in advance on the assumption of a steering system in which the steering wheel 11 and the steer wheels 16 are mechanically coupled to each other. The target steering angle computing circuit 52 finds an input toque by adding the target steering reaction force $T_1^*$ and the steering torque $T_h$ together, and computes a target steering angle $\theta^*$ from the input torque based on the ideal model.

The steering angle computing circuit 53 computes an actual steering angle $\theta_s$ of the steering wheel 11 based on a rotational angle $\theta_a$ of the reaction motor 31. The rotation angle $\theta_a$ of the reaction motor 31 is detected through the rotational angle sensor 33. The steering angle feedback control circuit 54 computes a steering angle correction amount $T_2^*$ through feedback control over the steering angle $\theta_s$ in order to cause the actual steering angle $\theta_s$ to follow the target steering angle $\theta^*$. The adder 55 calculates a steering reaction force command value T* by adding the steering angle correction amount $T_2^*$ to the target steering reaction force $T_1^*$.

The energization control circuit 56 supplies the reaction motor 31 with electric power commensurate with the steering reaction force command value T*. Specifically, the energization control circuit 56 computes a current command value for the reaction motor 31 based on the steering reaction force command value T*. The energization control circuit 56 detects an actual current value $I_a$ through a current sensor 57 provided in a power supply path for the reaction motor 31. The actual current value $I_a$ flows through the power supply path. The current value $I_a$ is a value of actual current that is supplied to the reaction motor 31. The energization control circuit 56 finds a deviation between the current command value and the actual current value $I_a$ and controls electric power supplied to the reaction motor 31 such that the deviation is eliminated (feedback control over the current $I_a$). Thus, the reaction motor 31 generates a torque commensurate with the steering reaction force command value T*. It is possible to provide an adequate resistance feel commensurate with a road surface reaction force to the driver.

As shown in FIG. 2, the wheel steering control circuit 50b includes a pinion angle computing circuit 61, a limiting control circuit 62, a pinion angle feedback control circuit 63, and an energization control circuit 64.

The pinion angle computing circuit 61 computes a pinion angle $\theta_p$ based on a rotational angle $\theta_b$ of the steering motor 41. The pinion angle $\theta_p$ is an actual rotational angle of the pinion shaft 44. The rotational angle $\theta_b$ of the steering motor 41 is detected through the rotational angle sensor 43. As described above, the steering motor 41 and the pinion shaft 44 are in conjunction with each other via the speed reduction mechanism 42. Therefore, there is a correlation between the rotational angle $\theta_b$ of the steering motor 41 and the pinion angle $\theta_p$. It is possible to find a pinion angle $\theta_p$ from the rotational angle $\theta_b$ of the steering motor 41 by using the correlation. As described above, the pinion shaft 44 is meshed with the wheel steering shaft 14. Therefore, there is also a correlation between the pinion angle $\theta_p$ and the amount of travel of the wheel steering shaft 14. In other words, the pinion angle $\theta_p$ is a value that reflects the wheel steering angle $\theta_w$ of the steer wheels 16.

The limiting control circuit 62 computes a limiting value $I_{lim}$ for limiting the magnitude of current that is supplied to the steering motor 41 according to, for example, a heat generation status of the steering motor 41. The limiting value $I_{lim}$ is set as an upper limit of the magnitude of current that is supplied to the steering motor 41 based on the viewpoint of protecting the steering motor 41 from overheating. The limiting control circuit 62 computes a limiting value $I_{lim}$ when a temperature Tm (estimated temperature) of the steering motor 41 exceeds a temperature threshold. The temperature Tm of the steering motor 41 is detected through a temperature sensor 62a provided near a power supply path for the steering motor 41. The limiting value $I_{lim}$ is, for example, set to a smaller value as the temperature of the steering motor 41 increases.

The pinion angle feedback control circuit 63 acquires a target steering angle $\theta^*$, computed by the target steering angle computing circuit 52, as a target pinion angle $\theta_p^*$. The pinion angle feedback control circuit 63 also acquires an actual pinion angle $\theta_p$ computed by the pinion angle computing circuit 61. The pinion angle feedback control circuit 63 computes a pinion angle command value $T_p^*$ through feedback control (PID control) over the pinion angle $\theta_p$ in order to cause the actual pinion angle $\theta_p$ to follow the target pinion angle $\theta_p$ (here, the actual pinion angle $\theta_p$ is equal to the target steering angle $\theta^*$).

The energization control circuit 64 supplies the steering motor 41 with an electric power commensurate with the pinion angle command value $T_p^*$. Specifically, the energization control circuit 64 computes a current command value for the steering motor 41 based on the pinion angle command value $T_p^*$. The energization control circuit 64 also detects an actual current value $I_b$ through a current sensor 64a provided in a power supply path for the steering motor 41. The actual current value $I_b$ flows through the power supply path. The current value $I_b$ is an actual value of current that is supplied to the steering motor 41. The energization control circuit 64 finds a deviation between the current command value and the actual current value $I_b$ and controls electric power supplied to the steering motor 41 such that the deviation is eliminated (feedback control over the current value $I_b$). Thus, the steering motor 41 rotates by an angle commensurate with the pinion angle command value $T_p^*$.

When the limiting value $I_{lim}$ is computed by the limiting control circuit 62, the energization control circuit 64 limits the magnitude of current that is supplied to the steering motor 41 (torque that is generated by the steering motor 41) according to the limiting value $I_{lim}$. The energization control circuit 64 compares the absolute value of current to be supplied to the steering motor 41 with the limiting value $I_{lim}$. When the absolute value of current to be supplied to the steering motor 41 is greater than the limiting value $I_{lim}$, the energization control circuit 64 limits the absolute value of current to be supplied to the steering motor 41 to the limiting value $I_{lim}$. When the absolute value of current to be supplied to the steering motor 41 is less than or equal to the limiting value $I_{lim}$, the energization control circuit 64 supplies the original current computed through feedback control over the current value $I_b$ directly to the steering motor 41.

Next, the target steering angle computing circuit 52 will be described in detail. As described above, the target steering angle computing circuit 52 computes a target steering angle $\theta^*$ based on an ideal model from an input torque that is the sum of a target steering reaction force $T_1^*$ and a steering torque $T_h$. The ideal model is a model that uses the fact that an input torque $T_{in}^*$, that is, a torque that is applied to the steering shaft 12, is expressed by the following mathematical expression (1).

$$T_{in}^* = J\theta^{*\prime\prime} + C\theta^{*\prime} + K\theta^* \qquad (1)$$

where J denotes the moment of inertia of the steering wheel 11 and steering shaft 12, C denotes the coefficient of viscosity (coefficient of friction) corresponding to a friction, or the like, on the housing of the wheel steering shaft 14, and K denotes a spring modulus on the assumption that the steering wheel 11 and the steering shaft 12 each are a spring.

As is apparent from the mathematical expression (1), a first value is obtained by multiplying a second order time-derivative value $\theta^{*\prime\prime}$ of a target steering angle $\theta^*$ by a moment of inertia J, a second value is obtained by multiplying a first order time-derivative value $\theta^{*\prime}$ of the target steering angle $\theta^*$ by a coefficient of viscosity C, a third value is obtained by multiplying the target steering angle $\theta^*$ by a spring modulus K, and an input torque $T_{in}^*$ is obtained by adding the first value, the second value, and the third value together. The target steering angle computing circuit 52 computes a target steering angle $\theta^*$ in accordance with the ideal model based on the mathematical expression (1).

Figure 3:
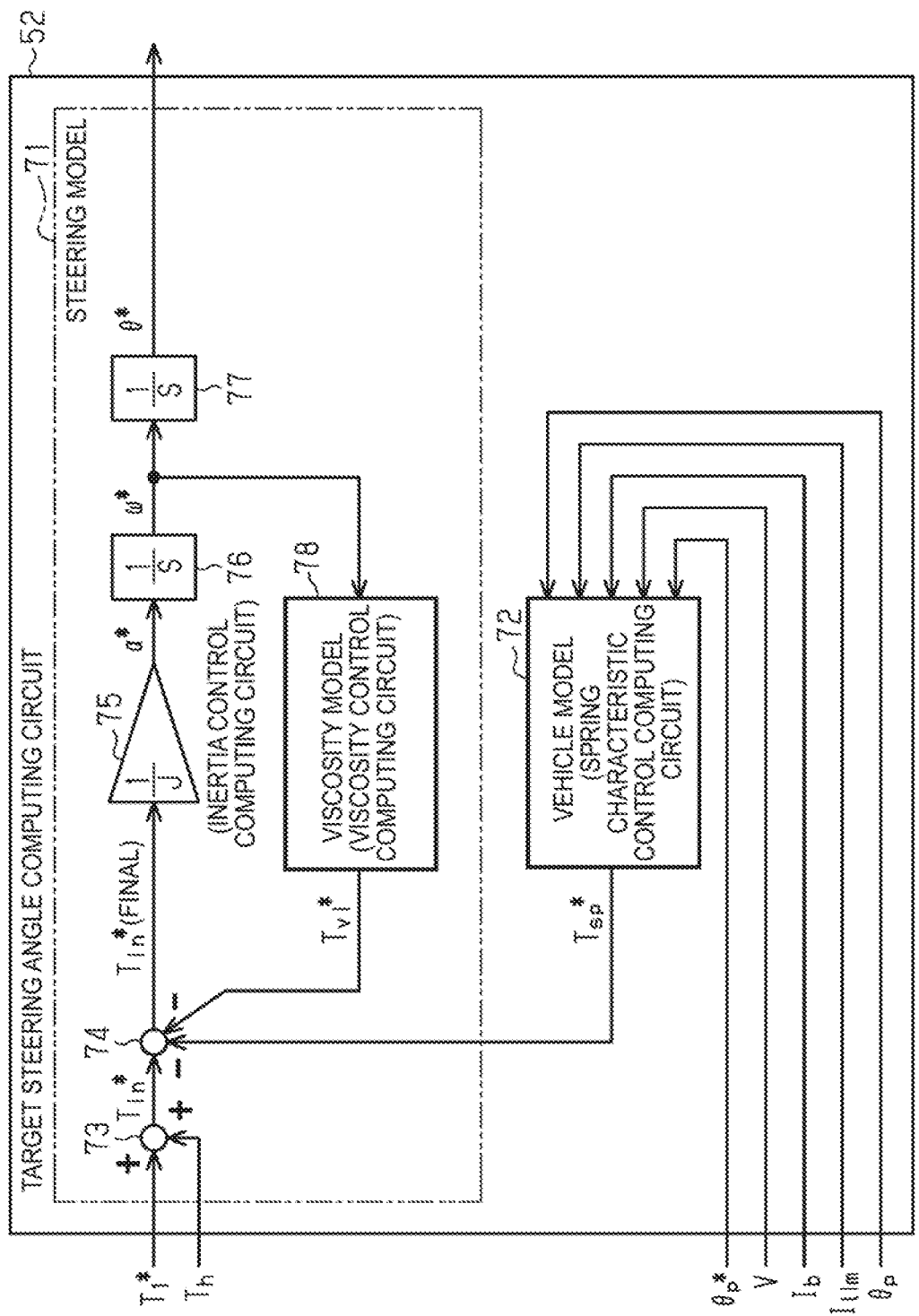
FIG. 3 is a control block diagram of a target steering angle computing circuit in the first embodiment.

As shown in FIG. 3, the ideal model based on the mathematical expression (1) can be divided into a steering model 71 and a vehicle model 72. The steering model 71 is tuned according to the characteristics of the components of the steering system 10, such as the steering shaft 12 and the reaction motor 31. The steering model 71 includes an adder 73, a subtractor 74, an inertia model 75, a first integrator 76, a second integrator 77, and a viscosity model 78.

The adder 73 computes an input torque $T_{in}^*$ by adding a target steering reaction force $T_1^*$ and a steering torque $T_h$. The subtractor 74 computes a final input torque $T_{in}^*$ by subtracting a viscosity component $T_{vi}^*$ and a spring component $T_{sp}^*$ (described later) from the input torque $T_{in}^*$ calculated by the adder 73.

The inertia model 75 functions as an inertia control computing circuit corresponding to the inertia term of the mathematical expression (1). The inertia model 75 computes a steering angle acceleration $\alpha^*$ by multiplying the final input torque $T_{in}^*$, calculated by the subtractor 74, by the inverse of the moment of inertia J.

The first integrator 76 computes a steering angle speed $\omega^*$ by integrating the steering angle acceleration $\alpha^*$ calculated by the inertia model 75. The second integrator 77 computes a target steering angle $\theta^*$ by further integrating the steering angle speed $\omega^*$ calculated by the first integrator 76. The target steering angle θ* is an ideal rotational angle of the steering wheel 11 (steering shaft 12) based on the steering model 71.

The viscosity model 78 functions as a viscosity control computing circuit corresponding to the viscosity term of the mathematical expression (1). The viscosity model 78 computes a viscosity component $T_{vi}*$ of the input torque $T_{in}*$ by multiplying the steering angle speed ω*, calculated by the first integrator 76, by the coefficient of viscosity C.

The vehicle model 72 is tuned according to the characteristics of the vehicle in which the steering system 10 is installed. The vehicle-side characteristics that influence the steering characteristics depend on, for example, the specifications of suspensions and wheel alignment, the grip (frictional force) of the steer wheels 16, and the like. The vehicle model 72 functions as a spring characteristic control computing circuit corresponding to the spring term of the mathematical expression (1). The vehicle model 72 computes a spring component $T_{sp}*$ (torque) of the input torque $T_i^{"}*$ by multiplying the target steering angle θ*, calculated by the second integrator 77, by the spring modulus K.

With the thus configured target steering angle computing circuit 52, it is possible to directly tune the relationship between the input torque $T_{in}*$ and the target steering angle θ* and, by extension, achieve desired steering characteristics by adjusting the moment of inertia J and coefficient of viscosity C of the steering model 71 and the spring modulus K of the vehicle model 72.

A target steering angle θ* that is computed from an input torque $T_{in}*$ based on the steering model 71 and the vehicle model 72 is used as a target pinion angle $θ_p*$. Feedback control is executed such that an actual pinion angle $θ_p$ matches the target pinion angle $θ_p*$. As described above, there is a correlation between the pinion angle $θ_p$ and the wheel steering angle $θ_w$ of the steer wheels 16. For this reason, the wheel steering operation of the steer wheels 16 commensurate with the input torque $I_{in}*$ is also determined by the steering model 71 and the vehicle model 72. In other words, a steering feel of the vehicle depends on the steering model 71 and the vehicle model 72. Therefore, it is possible to achieve a desired steering feel by adjusting the steering model 71 and the vehicle model 72.

However, in the thus configured controller 50, a steering reaction force (resistance experienced through steering) is just the one commensurate with a target steering angle θ*. In other words, a steering reaction force does not vary depending on a vehicle behavior or a road surface condition (such as slipperiness of a road surface). For this reason, it is difficult for the driver to understand a vehicle behavior or a road surface condition through a steering reaction force. Therefore, in the present embodiment, the vehicle model 72 is configured as follows based on the viewpoint of eliminating such concerns.

Figure 4:
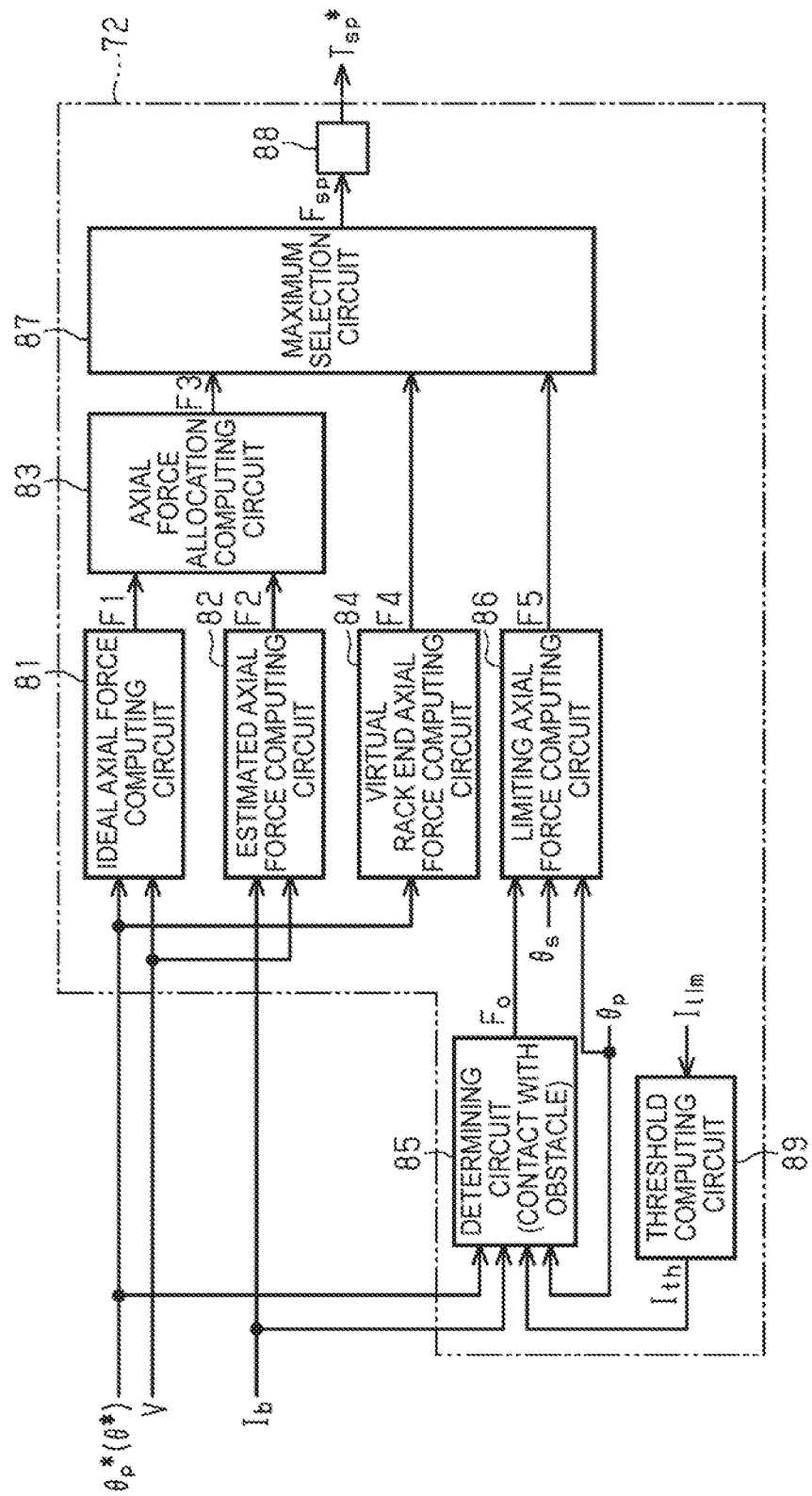
FIG. 4 is a control block diagram of a vehicle model in the first embodiment.

As shown in FIG. 4, the vehicle model 72 includes an ideal axial force computing circuit 81, an estimated axial force computing circuit 82, an axial force allocation computing circuit 83, a virtual rack end axial force computing circuit 84, a determining circuit 85, a limiting axial force computing circuit 86, a maximum selection circuit 87, and a conversion circuit 88.

The ideal axial force computing circuit 81 computes an ideal axial force F1 based on a target pinion angle $θ_p*$. The ideal axial force F1 is an ideal value of axial force that acts on the wheel steering shaft 14 through the steer wheels 16. The ideal axial force computing circuit 81 computes an ideal axial force F1 by using an ideal axial force map stored in a storage device of the controller 50. The ideal axial force map is a map of which the abscissa axis represents target pinion angle $θ_p*$ and the ordinate axis represents ideal axial force F1, and defines the relationship between a target pinion angle $θ_p*$ and an ideal axial force F1 according to a vehicle speed V. The ideal axial force map has the following characteristics. In other words, the ideal axial force F1 is set to a greater absolute value as the absolute value of the target pinion angle $θ_p*$ increases or as the vehicle speed V decreases. The absolute value of the ideal axial force F1 linearly increases with an increase in the absolute value of the target pinion angle $θ_p*$. The ideal axial force F1 is set to the same sign as the sign (positive or negative) of the target pinion angle $θ_p*$.

The estimated axial force computing circuit 82 computes an estimated axial force F2 (road surface reaction force) that acts on the wheel steering shaft 14 based on a current value $I_b$ of the steering motor 41. The current value $I_b$ of the steering motor 41 varies depending on the difference between a target pinion angle $θ_p*$ and an actual pinion angle $θ_p$ due to a disturbance commensurate with a road surface condition (road surface frictional resistance), acting on the steer wheels 16. In other words, the current value $I_b$ of the steering motor 41 reflects an actual road surface reaction force that acts on the steer wheels 16. For this reason, it is possible to compute an axial force that reflects the influence of a road surface condition based on the current value $I_b$ of the steering motor 41. An estimated axial force F2 is found by multiplying a gain by the current value $I_b$ of the steering motor 41. The gain is a coefficient commensurate with a vehicle speed V.

The axial force allocation computing circuit 83 computes a combined axial force F3 by adding a value obtained by multiplying the ideal axial force F1 by an associated distribution ratio (gain) and a value obtained by multiplying the estimated axial force F2 by an associated distribution ratio (gain). A distribution ratio is set according to various quantities of states that reflect a vehicle behavior, a road surface condition, or a steering status. A distribution ratio may be set based on only a vehicle speed V that is one of the quantities of states of the vehicle. In this case, for example, as the vehicle V increases, the distribution ratio of the ideal axial force F1 is set to a greater value, while the distribution ratio of the estimated axial force F2 is set to a less value. As the vehicle speed V decreases, the distribution ratio of the ideal axial force F1 is set to a less value, while the distribution ratio of the estimated axial force F2 is set to a greater value.

The virtual rack end axial force computing circuit 84 computes a virtual rack end axial force F4 for virtually limiting the operational range of the steering wheel 11 based on a target pinion angle $θ_p*$ (target steering angle θ*) as a virtual rack end angle. The virtual rack end axial force F4 is computed based on the viewpoint of, when the operating position of the steering wheel 11 is close to a limit position of the operational range and the wheel steering shaft 14 is close to a limit position of its physical movable range, steeply increasing a torque that is generated by the reaction motor 31 in a direction opposite from a steering direction (steering reaction torque). The limit position of the operational range of the steering wheel 11 depends on, for example, the length of a spiral cable provided in the steering wheel 11. The limit position of the physical operational range of the wheel steering shaft 14 means a position at which an end portion (rack end) of the wheel steering shaft 14 contacts the housing (not shown), that is, so-called end contact occurs, and, as a result, the movable range of the wheel steering shaft 14 is physically restricted.

The virtual rack end axial force computing circuit 84 computes a virtual rack end axial force F4 by using a virtual rack end map stored in the storage device of the controller 50. The virtual rack end map is a map of which the abscissa axis represents target pinion angle $\theta_p{}^*$ and the ordinate axis represents virtual rack end axial force F4, and defines the relationship between a target pinion angle $\theta_p{}^*$ and a virtual rack end axial force F4. The virtual rack end map has the following characteristics. In other words, until the absolute value of the target pinion angle $\theta_p{}^*$ reaches an end determination threshold with reference to zero, the virtual rack end axial force F4 is maintained at zero that is a neutral angle corresponding to a steering neutral position or a wheel steering neutral position. After the absolute value of the target pinion angle $\theta_p{}^*$ has reached the end determination threshold, the virtual rack end axial force F4 is generated and the virtual rack end axial force F4 steeply increases in a direction in which the absolute value increases.

The virtual rack end axial force F4 is set to the same sign as the sign (positive or negative) of the target pinion angle $\theta_p{}^*$. The end determination threshold is set based on a value close to the steering angle $\theta_s$ at the time when the steering wheel 11 reaches the limit position of the operational range or a value close to the pinion angle $\theta_p$ at the time when the wheel steering shaft 14 reaches the limit position of the movable range.

The determining circuit 85 determines whether any one of the steer wheels 16 is in contact with an obstacle, such as a curb. The determining circuit 85 determines that any one of the steer wheels 16 is in contact with an obstacle, such as a curb, when all the following three determination conditions (A1), (A2), (A3) are satisfied.

$$|\Delta\theta_p(=|\theta_p{}^*-\theta_p|)|>\theta_{th} \qquad (A1)$$

$$|I_b|>I_{th} \qquad (A2)$$

$$|\omega_p|<\omega_{th} \qquad (A3)$$

In the determination condition A1, $\theta_p{}^*$ is a target pinion angle, and $\theta_p$ is an actual pinion angle. $\Delta\theta_p$ is an angular deviation and is obtained by subtracting an actual pinion angle $\theta_p$ from a target pinion angle $\theta_p{}^*$. $\theta_{th}$ is an angular deviation threshold. The angular deviation threshold $\theta_{th}$ is set based on the following viewpoint. In other words, when any one of the steer wheels 16 is in contact with an obstacle, it is difficult to further turn the steer wheels 16. When the steering wheel 11 is operated to further turn in this state, the target steering angle $\theta^*$, by extension, the target pinion angle $\theta_p{}^*$, increases, according to the steering; whereas the wheel steering angle $\theta_w$, by extension, the pinion angle $\theta_p$, is maintained at a constant value. For this reason, in a situation in which any one of the steer wheels 16 is in contact with an obstacle, as the steer wheels 16 are attempted to turn more, a deviation between the target steering angle $\theta^*$ and the target pinion angle $\theta_p{}^*$ increases. Therefore, as the absolute value of the angular deviation $\Delta\theta_p$ increases, the probability that any one of the steer wheels 16 is in contact with an obstacle is higher. Hence, the angular deviation $\Delta\theta_p$ is a value that indicates the degree of likelihood of a situation in which any one of the steer wheels 16 is in contact with an obstacle. Based on this viewpoint, the angular deviation threshold $\theta_{th}$ is set by an experiment or simulation while tolerance caused by noise of the rotational angle sensor 43, or the like, is taken into consideration.

In the determination condition (A2), $I_b$ is a current value of the steering motor 41, and $I_{th}$ is a current threshold. The current threshold $I_{th}$ is set based on the following viewpoint. In other words, in a situation in which any one of the steer wheels 16 is in contact with an obstacle, as the steer wheels 16 are attempted to turn more, the absolute value of the current value $I_b$ of the steering motor 41 increases. For this reason, as the absolute value of the current value $I_b$ of the steering motor 41 increases, the probability that any one of the steer wheels 16 is in contact with an obstacle is higher. Therefore, the current value $I_b$ of the steering motor 41 is also a value that indicates the degree of likelihood of a situation in which any one of the steer wheels 16 is in contact with an obstacle. Based on this viewpoint, the current threshold $I_{th}$ is set by an experiment or simulation.

In the determination condition (A3), $\omega_p$ is a pinion angular velocity and is obtained by differentiating a target pinion angle $\theta_p{}^*$ or a pinion angle $\theta_p$. $\omega_{th}$ is an angular velocity threshold. The angular velocity threshold $\omega_{th}$ is set based on the following viewpoint. In other words, in a situation in which any one of the steer wheels 16 is in contact with an obstacle, it is difficult to turn the steer wheels 16. For this reason, as the absolute value of the wheel steering speed of the steer wheels 16, by extension, the absolute value of the pinion angular velocity $\omega_p$, reduces, the probability that any one of the steer wheels 16 is in contact with an obstacle is higher. Therefore, the pinion angular velocity $\omega_p$ is also a value that indicates the degree of likelihood of a situation in which any one of the steer wheels 16 is in contact with an obstacle. Based on this viewpoint, the angular velocity threshold $\omega_{th}$ is set by an experiment or simulation while tolerance caused by noise of the rotational angle sensor 43, or the like, is taken into consideration.

The determining circuit 85 sets the value of a flag Fo according to a determination result as to whether any one of the steer wheels 16 is in contact with an obstacle. When the determining circuit 85 determines that any one of the steer wheels 16 is not in contact with an obstacle, that is, when at least one of the three determination conditions (A1), (A2), (A3) is not satisfied, the determining circuit 85 sets the value of the flag Fo to "0". When the determining circuit 85 determines that any one of the steer wheels 16 is in contact with an obstacle, that is, when all the three determination conditions (A1), (A2), (A3) are satisfied, the determining circuit 85 sets the value of the flag Fo to "1".

In a situation in which any one of the steer wheels 16 is in contact with an obstacle, the limiting axial force computing circuit 86 computes a limiting axial force F5 for limiting steering to a side on which the steer wheel 16 is in contact with the obstacle. The limiting axial force computing circuit 86 recognizes whether a limiting axial force F5 needs to be computed based on a result determined by the determining circuit 85, that is, the value of the flag Fo. When the value of the flag Fo is "0", the limiting axial force computing circuit 86 does not compute a limiting axial force F5. When the value of the flag Fo is "1", the limiting axial force computing circuit 86 computes a limiting axial force F5.

The limiting axial force computing circuit 86 computes a limiting axial force F5 based on the steering angle $\theta_s$ computed by the steering angle computing circuit 53 and the pinion angle $\theta_p$ computed by the pinion angle computing circuit 61. At the time of computing a limiting axial force F5, the limiting axial force computing circuit 86 computes the difference (angular deviation) between the steering angle $\theta_s$ and the pinion angle $\theta_p$ by subtracting the pinion angle $\theta_p$ from the steering angle $\theta_s$. The limiting axial force computing circuit 86 computes a limiting axial force F5 by using a limiting axial force map stored in the storage device of the controller 50. The limiting axial force map is a map of which the abscissa axis represents the absolute value of the difference between a steering angle $\theta_s$ and a pinion angle $\theta_p$ and the ordinate axis represents limiting axial force F5, and defines the relationship between a limiting axial force F5 and the difference between a steering angle $\theta_s$ and a pinion angle $\theta_p$.

The limiting axial force map has, for example, the following characteristics. In other words, when the absolute value of the difference between a steering angle $\theta_s$ and a pinion angle $\theta_p$ is a value that falls within the range from zero to a difference threshold, the limiting axial force F5 gently increases with an increase in the absolute value of the difference between a steering angle $\theta_s$ and a pinion angle $\theta_p$. After the absolute value of the difference between a steering angle $\theta_s$ and a pinion angle $\theta_p$ has reached the difference threshold, the limiting axial force F5 steeply increases with an increase in the absolute value of the difference between a steering angle $\theta_s$ and a pinion angle $\theta_p$.

The difference threshold is a value that does not matter even when it is determined that any one of the steer wheels 16 is in contact with an obstacle and is set by an experiment or simulation. After the absolute value of the difference between a steering angle $\theta_s$ and a pinion angle $\theta_p$ has reached the difference threshold, the limiting axial force F5 is set based on the viewpoint of generating a steering reaction force to an extent such that it is difficult for the driver to steer to a side on which the any one of the steer wheels 16 is in contact with the obstacle.

The limiting axial force computing circuit 86 may compute a limiting axial force F5 in consideration of the current value $I_b$ of the steering motor 41 and the pinion angular velocity $\omega_p$ in addition to the difference between the steering angle $\theta_s$ and the pinion angle $\theta_p$. In other words, the limiting axial force computing circuit 86 totally takes the degree of likelihood of a situation in which any one of the steer wheels 16 is in contact with an obstacle based on the difference between the steering angle $\theta_s$ and the pinion angle $\theta_p$, the current value $I_b$ of the steering motor 41, and the pinion angular velocity $\omega_p$, and computes a limiting axial force F5 according to the degree.

Alternatively, the limiting axial force computing circuit 86 may compute a limiting axial force F5 based on the difference between a target steering angle $\theta^*$ and a pinion angle $\theta_p$ instead of the difference between a steering angle $\theta_s$ and a pinion angle $\theta_p$. The difference between a target steering angle $\theta^*$ and a pinion angle $\theta_p$ is also a value that indicates the degree of probability of a situation in which any one of the steer wheels 16 is in contact with an obstacle. Alternatively, the limiting axial force computing circuit 86 may compute a limiting axial force F5 based on the difference between a target steering angle $\theta^*$ and a wheel steering angle that is obtained by multiplying a pinion angle $\theta_p$ by a predetermined conversion coefficient, instead of the difference between a steering angle $\theta_s$ and a pinion angle $\theta_p$.

The maximum selection circuit 87 acquires the combined axial force F3 computed by the axial force allocation computing circuit 83, the virtual rack end axial force F4 computed by the virtual rack end axial force computing circuit 84, and the limiting axial force F5 computed by the limiting axial force computing circuit 86. The maximum selection circuit 87 selects the greatest axial force in absolute value from among the acquired combined axial force F3, virtual rack end axial force F4, and limiting axial force F5 and sets the selected combined axial force F3, virtual rack end axial force F4, or limiting axial force F5 as a final axial force $F_{sp}$ that is used in computing a spring component $T_{sp}$ for the input torque $T_{in}^*$.

The conversion circuit 88 computes (converts) the spring component $T_{sp}^*$ for the input torque $T_{in}^*$ based on the final axial force $F_{sp}$ set by the maximum selection circuit 87. When the combined axial force F3 is set as the final axial force $F_{sp}$ by the maximum selection circuit 87, the spring component $T_{sp}^*$ based on this final axial force $F_{sp}$ is incorporated into the input torque $T_{in}^*$, with the result that it is possible to apply a steering reaction force commensurate with a vehicle behavior or a road surface condition to the steering wheel 11. The driver is able to understand a vehicle behavior or a road surface condition by experiencing a steering reaction force as a resistance via the steering wheel 11.

When the virtual rack end axial force F4 is set as the final axial force $F_{sp}$ by the maximum selection circuit 87, the spring component $T_{sp}^*$ based on this final axial force $F_{sp}$ is incorporated into the input torque $T_{in}^*$, with the result that the steering reaction force steeply increases. For this reason, it is difficult for the driver to operate the steering wheel 11 in a direction in which the absolute value of the steering angle increases. Therefore, the driver is able to recognize that the steering wheel 11 has reached the limiting position of the virtual operational range by experiencing a resistance feel as a steering reaction force (resistance).

When the limiting axial force F5 is set as the final axial force $F_{sp}$ by the maximum selection circuit 87, the spring component $T_{sp}^*$ based on this final axial force $F_{sp}$ is incorporated into the input torque $T_{in}^*$, with the result that the steering reaction force steeply increases. For this reason, it is difficult for the driver to operate the steering wheel 11 in the direction in which any one of the steer wheels 16 is in contact with the obstacle. Therefore, the driver experiences a resistance feel as a steering reaction force and is able to recognize a situation in which the any one of the steer wheels 16 is in contact with the obstacle, such as a curb.

In this way, through control over the reaction motor 31 and the steering motor 41 by the controller 50, it is possible to inform a vehicle behavior, a road surface condition, a steering status of the steering wheel 11, or a wheel steering status of the steer wheels 16 to the driver through a steering reaction force via the steering wheel 11. However, in control that is executed by the controller 50, there are the following concerns.

In other words, the controller 50 employs the current value $I_b$ of the steering motor 41 as one of the determination conditions as to whether any one of the steer wheels 16 is in contact with an obstacle, such as a curb. The controller 50 has a current limiting function of limiting the magnitude of current that is supplied to the steering motor 41 according to a heat generation status of the steering motor 41. The current limiting function may become a bottleneck in determining whether any one of the steer wheels 16 is in contact with an obstacle.

For example, when any one of the steer wheels 16 contacts an obstacle, such as a curb, while stationary steering at the time of a start of the vehicle, the magnitude of current that is supplied to the steering motor 41 steeply increases, and, as a result, the temperature of the steering motor 41 also steeply increases. For this reason, before the current value $I_b$ of the steering motor 41 reaches the current threshold $I_{th}$, the magnitude of current that is supplied to the steering motor 41 may be limited as a result of the fact that the temperature of the steering motor 41 is close to an overheating state. Therefore, there are concerns that, although any one of the steer wheels 16 is actually in contact with an obstacle, the contact of the any one of the steer wheels 16 with the obstacle is not appropriately determined.

In this case, a steering reaction force for informing the driver of the situation in which any one of the steer wheels 16 is in contact with an obstacle is also not generated.

Therefore, in the present embodiment, in order to appropriately inform the driver of a situation in which any one of the steer wheels 16 is in contact with an obstacle through a steering reaction force via the steering wheel 11, the following configuration is employed as the vehicle model 72.

As shown in FIG. 4, the vehicle model 72 includes a threshold computing circuit 89. The threshold computing circuit 89 changes the current threshold $I_{th}$ according to the limiting value $I_{lim}$ computed by the limiting control circuit 62. The current threshold $I_{th}$ is one of criteria at the time of determining that any one of the steer wheels 16 is in contact with an obstacle. Specifically, the configuration is as follows.

Figure 5:
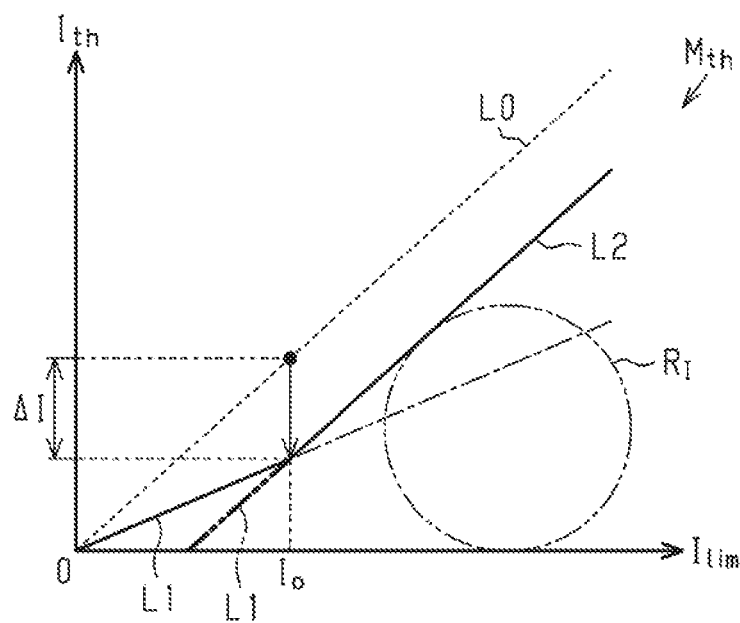
FIG. 5 is a graph that shows the relationship between a current limiting value and a current threshold for determining contact with a curb in the first embodiment.

As shown in the graph of FIG. 5, the threshold computing circuit 89 computes a current threshold $I_{th}$ by using a threshold map $M_{th}$. The threshold map $M_{th}$ is a map of which the abscissa axis represents limiting value $I_{lim}$ and the ordinate axis represents current threshold $I_{th}$, and defines the relationship between a limiting value $I_{lim}$ and a current threshold $I_{th}$. The threshold map $M_{th}$ has the following characteristics. In other words, the current threshold $I_{th}$ linearly increases with an increase in limiting value $I_{lim}$. As represented by characteristic lines L1, L2 in the graph of FIG. 5, the slope that is the ratio of an increase in current threshold $I_{th}$ to an increase in limiting value $I_{lim}$ varies between before the limiting value $I_{lim}$ reaches a predetermined value $I_0$ and after the limiting value $I_{lim}$ reaches the predetermined value $I_0$. The slope of the current threshold $I_{th}$ (the slope of the characteristic line L2) after the limiting value $I_{lim}$ has reached the predetermined value $I_0$ is set so as to be greater than the slope of the current threshold $I_{th}$ (the slope of the characteristic line L1) before the limiting value $I_{lim}$ reaches the predetermined value $I_0$.

However, the current threshold $I_{th}$ is set to a value less than the limiting value $I_{lim}$. When the current threshold $I_{th}$ is set to the same value as the limiting value $I_{lim}$ in a one-to-one correspondence, the current threshold $I_{th}$ linearly varies at a slope of "1" with a change in limiting value $I_{lim}$ as shown by the characteristic line L0 in the graph of FIG. 5. The characteristic line L2 is obtained by making the offset of (translating) the characteristic line L0 in a negative direction by the amount of a set value $\Delta I$ and is parallel to the characteristic line L0. The characteristic line L1 shows a value of a current threshold $I_{th1}$ in the case where the limiting value $I_{lim}$ is a value that falls within the range from zero to the predetermined value $I_0$ and is set to complement a gap between zero and the characteristic line L2. The slope of the characteristic line L1 differs from the characteristic line L0 or the characteristic line L2.

The predetermined value $I_0$ is set based on a practical range of the limiting value $I_{lim}$ or current threshold $I_{th}$. In other words, a region that is actually used in the threshold map $M_{th}$ is a region in which the limiting value $I_{lim}$ is greater than or equal to the predetermined value $I_0$. The current threshold $I_{th}$ is also actually set based on the characteristic line L2. As represented by the alternate long and two-short dashed line in FIG. 5, the characteristics of the current threshold $I_{th}$ against the limiting value $I_{lim}$ that is, the characteristic lines L1, L2, are set so as not to overlap a practical current range $R_I$ that is the range of the current value $I_b$ that can be supplied to the steering motor 41 in a normal usage state of the vehicle. Examples of the normal service state of the vehicle include a state where the vehicle is traveling on a dry road with grip and a stationary steering state where the steering wheel 11 is turned while the vehicle is stopped.

Next, the operation resulting from computation of a current threshold $I_{th}$ by using the threshold map $M_{th}$ will be described.

As represented by the characteristic line L0 in the graph of FIG. 5, it is conceivable that, for example, the current threshold $I_{th}$ for determining the contact with an obstacle is set to the same value as the limiting value $I_{lim}$ computed by the limiting control circuit 62. However, in this case, the current value $I_b$ of the steering motor 41 also reaches the limiting value $I_{lim}$ at the timing of reaching the current threshold $I_{th}$. In other words, when the current value $I_b$ of the steering motor 41 reaches the current threshold $I_{th}$, the steering motor 41 has been already placed in a situation to be protected from overheating.

In terms of this point, the controller 50 of the present embodiment acquires a limiting value $I_{lim}$ computed by the limiting control circuit 62 and computes a current threshold $I_{th}$ less than the acquired limiting value $I_{lim}$. The controller 50 determines whether the determination condition (A2) is satisfied through a comparison between the current threshold $I_{th}$ and the current value $I_b$ of the steering motor 41. Because the current threshold $I_{th}$ is set to a value less than the limiting value $I_{lim}$ for example, when any one of the steer wheels 16 is in contact with an obstacle, such as a curb, while stationary steering at the time of a start of the vehicle, the current value $I_b$ of the steering motor 41 reaches the current threshold $I_{th}$ before being limited to the limiting value $I_{lim}$. For this reason, the controller 50 is able to appropriately determine that any one of the steer wheels 16 is in contact with an obstacle. Therefore, the controller 50 is able to appropriately generate a steering reaction force for informing the driver of a situation in which any one of the steer wheels 16 is in contact with an obstacle.

According to the first embodiment, the following advantageous effects are obtained. The controller 50 sets the current threshold $I_{th}$ to a value less than the limiting value $I_{lim}$. The current threshold $I_{th}$ is a criterion for determination as to whether any one of the steer wheels 16 is in contact with an obstacle. For this reason, even in a situation in which the magnitude of current that is supplied to the steering motor 41 should be limited, the controller 50 is able to determine that any one of the steer wheels 16 is in contact with an obstacle. Therefore, the controller 50 is able to inform the driver of a situation in which any one of the steer wheels 16 is in contact with an obstacle, through a steering reaction force via the steering wheel 11. The driver is able to recognize a situation in which any one of the steer wheels 16 is in contact with an obstacle by experiencing a resistance feel as a steering reaction force. In addition, steering of the driver to further turn toward an obstacle is suppressed, and steering to avoid the contact of any one of the steer wheels 16 with an obstacle is prompted.

In the threshold map $M_{th}$, the characteristic line L2 is set as the practical characteristics of a current threshold $I_{th}$ against a limiting value $I_{lim}$, and the characteristic line L2 is set by making the offset of the characteristic line L0 in a negative direction by a set value $\Delta I$. The characteristic line L0 represents the characteristics at the time when the current threshold $I_{th}$ is set to the same value as the limiting value $I_{lim}$. For this reason, it is possible to easily construct the threshold map $M_{th}$. As represented by the alternate long and short-dashed line in the graph of FIG. 5, for example, when the slope of the characteristic line L2 is set to the same slope as that of the characteristic line L1, the current threshold $I_{th}$ against a limiting value $I_{lim}$ may be excessively small and, therefore, the contact of any one of the steer wheels 16 with an obstacle may be sensitively detected. In terms of this point, as represented by the continuous line in the graph of FIG. 5, by setting the characteristic line L2 parallel to the characteristic line L1, it is possible to appropriately detect that any one of the steer wheels 16 is in contact with an obstacle.

The characteristics of changes in current threshold $I_{th}$ against a limiting value $I_{lim}$, that is, the characteristic lines L1, L2, are set so as not to overlap a practical current range $R_I$ that is the range of the current value $I_b$ that is supplied to the steering motor 41 in a normal usage state of the vehicle. For this reason, in a normal traveling state of the vehicle, erroneous determination that any one of the steer wheels 16 is in contact with an obstacle is reduced.

Next, a second embodiment of the steering control apparatus will be described. The present embodiment basically has a similar configuration to that of the first embodiment shown in FIG. 1 to FIG. 3. The present embodiment differs from the first embodiment in that a configuration in which the limiting axial force computing circuit 86 is omitted from the vehicle model 72 is employed.

Figure 6:
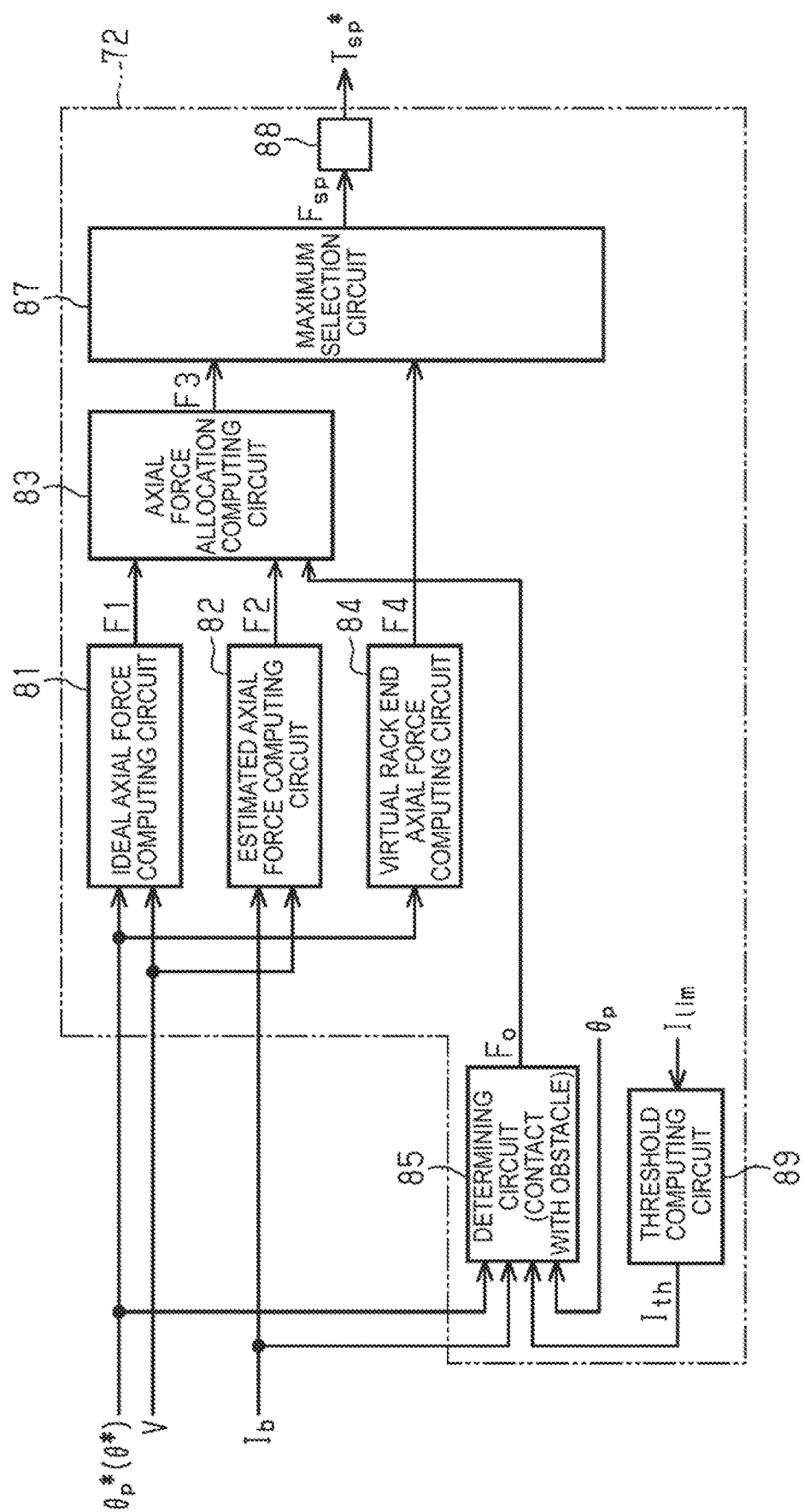
FIG. 6 is a control block diagram of a vehicle model in a second embodiment.

As shown in FIG. 6, the vehicle model 72 includes the ideal axial force computing circuit 81, the estimated axial force computing circuit 82, the axial force allocation computing circuit 83, the virtual rack end axial force computing circuit 84, the determining circuit 85, the maximum selection circuit 87, the conversion circuit 88, and the threshold computing circuit 89. When the determining circuit 85 determines that any one of the steer wheels 16 is in contact with an obstacle, that is, the value of the flag Fo is "1", the axial force allocation computing circuit 83 supplies the maximum selection circuit 87 with the estimated axial force F2 instead of the combined axial force F3 regardless of a vehicle behavior, a road surface condition, or a steering status.

When any one of the steer wheels 16 is in contact with an obstacle, an actual pinion angle $\theta_p$ cannot follow the target pinion angle $\theta_p^*$ because the wheel steering operation of the steer wheels 16 is restricted, so the current value $I_b$ of the steering motor 41 steeply increases. In other words, the current value $I_b$ of the steering motor 41, by extension, the estimated axial force F2 computed based on the current value $I_b$ of the steering motor 41, reflects a situation in which any one of the steer wheels 16 is in contact with an obstacle.

Therefore, when the estimated axial force F2 is set as the final axial force $F_{sp}$ by the maximum selection circuit 87, a spring component $T_{sp}^*$ based on this final axial force $F_{sp}$ is incorporated into the input torque $T_{in}^*$ and, as a result, a steering reaction force steeply increases. Therefore, the driver experiences a resistance feel as a steering reaction force and is able to recognize a situation in which any one of the steer wheels 16 is in contact with an obstacle, such as a curb. According to the second embodiment, similar advantageous effects to those of the first embodiment are obtained.

The first and second embodiments may be modified as follows. In the first and second embodiments, the characteristics of a current threshold $I_{th}$ against a limiting value $I_{lim}$ do not need to change in a polygonal line as represented by the characteristic lines L1, L2 in the graph of FIG. 5 with a change in limiting value $I_{lim}$. For example, the current threshold $I_{th}$ may have such characteristics that pass through the origin of the threshold map $M_{th}$ and linearly change with a change in limiting value $I_{lim}$. The characteristic line L1 that represents the relationship between a limiting value $I_{lim}$ and a current threshold $I_{th}$ at the time when the limiting value $I_{lim}$ is a value that falls within the range of zero to the predetermined value $I_O$ may be set based on a similar viewpoint to that of the characteristic line L2. In other words, as represented by the wide alternate long and two-short dashed line in FIG. 5, the characteristic line L1 may be the one obtained by making the offset of (translating) the characteristic line L0 in a negative direction by the amount of set value $\Delta I$ along the ordinate axis. In this case, the slope of the characteristic line L1 is the same as those of the characteristic lines L0, L2, and the characteristic lines L1, L2 each are a single straight line (characteristic line) having a constant slope.

In the first and second embodiments, the virtual rack end axial force F4 and the limiting axial force F5 both are supplied to the maximum selection circuit 87. Alternatively, the following configuration is also applicable. The maximum selection circuit 87 serves as a first maximum selection circuit, and a second maximum selection circuit is provided in a computing path between the maximum selection circuit 87 and both the virtual rack end axial force computing circuit 84 and the limiting axial force computing circuit 86. The second maximum selection circuit selects the greatest axial force in absolute value from among the virtual rack end axial force F4 and the limiting axial force F5, and sets the selected virtual rack end axial force F4 or limiting axial force F5 as an axial force that is supplied to the first maximum selection circuit 87.

In the first and second embodiments, a configuration including an adder instead of the maximum selection circuit 87 may be employed as the vehicle model 72. The adder computes a final axial force $F_{sp}$ that is used to compute a spring component $T_{sp}^*$ for an input torque $T_{in}^*$ by adding a combined axial force F3, a virtual rack end axial force F4, and a limiting axial force F5. With this configuration as well, it is possible to incorporate the combined axial force F3, the virtual rack end axial force F4, and the limiting axial force F5 into a steering reaction force.

In the first and second embodiments, the target steering reaction computing circuit 51 is configured to find a target steering reaction force $T_1^*$ based on a steering torque $T_h$ and a vehicle speed V. Alternatively, the target steering reaction computing circuit 51 may be configured to find a target steering reaction force $T_1^*$ based on only a steering torque $T_h$.

In the first and second embodiments, the target steering angle computing circuit 52 computes a target steering angle $\theta^*$ of the steering wheel 11 by using an input torque $T_{in}^*$ that is the sum of a target steering reaction force $T_1^*$ and a steering torque $T_h$. Alternatively, the target steering angle computing circuit 52 may compute a target steering angle $\theta^*$ of the steering wheel 11 by using only a steering torque $T_h$ or only a target steering reaction force $T_1^*$ as an input torque $T_{in}^*$.

In the first and second embodiments, the ideal axial force computing circuit 81 computes an ideal axial force F1 based on a target pinion angle $\theta_p$ and a vehicle speed V; however, the ideal axial force computing circuit 81 is not necessarily required to consider a vehicle speed V at the time of computing an ideal axial force F1. Alternatively, the ideal axial force computing circuit 81 may find an ideal axial force F1 by using a target wheel steering angle that is obtained by multiplying a target pinion angle $\theta_p$ by a predetermined conversion coefficient, instead of a target pinion angle $\theta_p^*$.

In the first and second embodiments, the estimated axial force computing circuit 82 computes an estimated axial force F2 based on the current value $I_b$ of the steering motor 41. Alternatively, the estimated axial force computing circuit 82 may, for example, estimate and compute an axial force that acts on the wheel steering shaft 14 based on a lateral acceleration or yaw rate detected through an in-vehicle sensor. For example, it is possible to find an estimated axial force by multiplying a gain by a lateral acceleration. The gain is a coefficient commensurate with a vehicle speed V. Because a lateral acceleration reflects a road surface condition, such as a road surface frictional resistance, or a vehicle behavior, so an estimated axial force computed based on a lateral acceleration reflects an actual road surface condition. it is also possible to find an estimated axial force by multiplying a yaw rate derivative value that is a derivative value of yaw rate by a vehicle speed gain that is a coefficient commensurate with a vehicle speed V. Because a yaw rate reflects a road surface condition, such as a road surface frictional resistance, or a vehicle behavior, so an estimated axial force computed based on a yaw rate reflects an actual road surface condition. Alternatively, the estimated axial force computing circuit 82 may detect an axial force that acts on the wheel steering shaft 14 through an in-vehicle sensor and estimate and compute an axial force that acts on the wheel steering shaft 14 based on the detected axial force. Alternatively, the estimated axial force computing circuit 82 may detect a tire force through an in-vehicle sensor and estimate and compute an axial force that acts on the wheel steering shaft 14 based on the detected tire force.

In the first and second embodiments, the virtual rack end axial force computing circuit 84 may be configured to compute a virtual rack end axial force F4 by using a steering angle $\theta_s$ and a pinion angle $\theta_p$ instead of a target steering angle $\theta^*$ and a target pinion angle $\theta_p^*$. In this case, the virtual rack end axial force computing circuit 84 uses a greater one in absolute value of a steering angle $\theta_s$ and a pinion angle $\theta_p$ as a virtual rack end angle $\theta_{end}$ to compute a virtual rack end axial force F4.

In the first embodiment, a configuration in which the ideal axial force computing circuit 81 and the axial force allocation computing circuit 83 are omitted may be employed as the vehicle model 72. In this case, an estimated axial force F2 computed by the estimated axial force computing circuit 82 is directly supplied to the maximum selection circuit 87.

In the first and second embodiments, a configuration in which the virtual rack end axial force computing circuit 84 is omitted may be employed as the vehicle model 72. In the first and second embodiments, three determination conditions (A1), (A2), (A3) are set as determination conditions as to whether any one of the steer wheels 16 is in contact with an obstacle; however, at least the determination condition (A2) just needs to be set.

In the first and second embodiments, the controller 50 is configured to calculate a steering reaction force command value T* by adding a steering angle correction amount $T_2^*$ to a target steering reaction force $T_1^*$. Alternatively, a steering angle correction amount $T_2^*$ may be used as a steering reaction force command value T*. In this case, a configuration in which the adder 55 is omitted may be employed as the controller 50. A target steering reaction force $T_1^*$ computed by the target steering reaction computing circuit 51 is supplied to only the target steering angle computing circuit 52. A steering angle correction amount $T_2^*$ that is a steering reaction force command value T* computed by the steering angle feedback control circuit 54 is supplied to the energization control circuit 56.

In the first and second embodiments, a clutch may be provided in the steering system 10. In this case, as represented by the alternate long and two-short dashed line in FIG. 1, the steering shaft 12 and the pinion shaft 13 are coupled via the clutch 21. An electromagnetic clutch that provides or interrupts power by supplying or interrupting current to an exciting coil is employed as the clutch 21. The controller 50 executes engage/disengage control for engaging or disengaging the clutch 21. When the clutch 21 is disengaged, power transmission between the steering wheel 11 and the steer wheels 16 is mechanically interrupted. When the clutch 21 is engaged, power transmission between the steering wheel 11 and the steer wheels 16 is mechanically allowed.

What is claimed is:

1. A steering system comprising:
   a mechanism configured to turn a steer wheel of a vehicle;
   a motor configured to generate driving force that is applied to the mechanism; and
   a controller configured to control the motor according to a steering status, wherein the controller includes:
   a limiting control circuit configured to limit a current that is supplied to the motor to a limiting value,
   a determining circuit configured to determine whether the steer wheel is in contact with an obstacle by using at least a comparison between a value of the current that is supplied to the motor and a threshold such that, when the value of the current supplied to the motor exceeds the threshold, it is determined that the steer wheel is in contact with the obstacle, and
   a threshold computing circuit configured to compute the threshold that is used by the determining circuit, wherein the threshold is set to be less than the limiting value by a fixed amount in a range where the limiting value is equal to or above a predetermined value.

2. The steering system according to claim 1, wherein the threshold computing circuit is configured to compute the threshold such that the threshold does not fall within a practical current range that is a range of the value of the current that is supplied to the motor in a normal usage state of the vehicle.

3. The steering system according to claim 1, wherein:
   the mechanism includes a steering shaft configured to rotate in conjunction with an operation of a steering wheel and a wheel steering shaft provided such that power transmission between the steering wheel and the wheel steering shaft is separated; and
   the motor includes a reaction motor configured to generate a steering reaction force based on a first command value that is computed according to the steering status and a steering motor configured to generate a wheel steering force based on a second command value that is computed according to the steering status, the steering reaction force is a torque in a direction opposite from a direction of steering of the steering shaft, the wheel steering force is a torque for turning the steer wheel and is applied to the wheel steering shaft.

4. The steering system according to claim 3, wherein:
   the controller includes a limiting axial force computing circuit configured to compute a limiting axial force as control for, when the determining circuit determines that the steer wheel is in contact with the obstacle, informing a driver that the steer wheel is in contact with the obstacle; and
   the limiting axial force is an axial force of the wheel steering shaft to be incorporated into the first command value for the reaction motor to virtually limit the operation of the steering wheel.

5. The steering system according to claim 3, wherein: the controller includes an ideal axial force computing circuit configured to compute an ideal axial force that is an ideal axial force of the wheel steering shaft based on a target rotational angle of a rotor that rotates in conjunction with a turning motion of the steer wheel, an estimated axial force computing circuit configured to compute an axial force of the wheel steering shaft as an estimated axial force based on a current value of the steering motor, the current value reflecting a vehicle behavior, a road surface condition, or the steering status, and an allocation computing circuit configured to compute a combined axial force as the axial force of the wheel steering shaft to be incorporated into the first command value for the reaction motor by combining the estimated axial force and the ideal axial force according to the vehicle behavior, the road surface condition, or the steering status; and the allocation computing circuit is configured to, when the determining circuit determines that the steer wheel is in contact with the obstacle, switch the axial force of the wheel steering shaft to be incorporated into the first command value for the reaction motor from the combined axial force to the estimated axial force as control for informing a driver that the steer wheel is in contact with the obstacle.

* * * * *